(12) United States Patent
Karabed (10) Patent No.: US 10,597,155 B2
(45) Date of Patent: Mar. 24, 2020

(54) SHADOW CASTING DRONE

(71) Applicant: Razmik Karabed, San Jose, CA (US)

(72) Inventor: Razmik Karabed, San Jose, CA (US)

( * ) Notice: Subject to any disclaimer, the term of this patent is extended or adjusted under 35 U.S.C. 154(b) by 219 days.

(21) Appl. No.: 15/441,232

(22) Filed: Feb. 23, 2017

(65) Prior Publication Data

US 2017/0240280 A1 Aug. 24, 2017

Related U.S. Application Data

(60) Provisional application No. 62/299,059, filed on Feb. 24, 2016.

(51) Int. Cl.
*B64C 39/02* (2006.01)

(52) U.S. Cl.
CPC ...... *B64C 39/024* (2013.01); *B64C 2201/027* (2013.01); *B64C 2201/12* (2013.01)

(58) Field of Classification Search
CPC ............ B64C 39/024; B64C 2201/027; B64C 2201/12
See application file for complete search history.

(56) References Cited

U.S. PATENT DOCUMENTS

| | | | | |
|---|---|---|---|---|
| 6,571,815 B1* | 6/2003 | Hill | ......................... | E04H 15/58 135/117 |
| 7,726,601 B2* | 6/2010 | Hershkovitz | .......... | A01G 15/00 244/1 TD |
| 2007/0246601 A1* | 10/2007 | Layton | ................ | B64C 29/0025 244/12.2 |
| 2011/0315811 A1* | 12/2011 | Al-Garni | ................ | A45B 23/00 244/30 |
| 2015/0298799 A1* | 10/2015 | Bertrand | ................ | A63H 27/12 701/23 |
| 2016/0018822 A1 | 1/2016 | Nevdahs et al. | | |
| 2016/0200415 A1* | 7/2016 | Cooper | .................. | A63H 27/12 244/17.15 |

(Continued)

OTHER PUBLICATIONS

Portions of prosecution history of U.S. Appl. No. 15/443,355, filed Nov. 26, 2018 , Karabed, Razmik, Portions of prosecution history of commonly owned U.S. Appl. No. 15/443,355, listed as item #3 above, including actions and/or responses/amendments (10 pages).

(Continued)

*Primary Examiner* — Valentina Xavier
(74) *Attorney, Agent, or Firm* — Makoui Law, PC; Ali Makoui (57) ABSTRACT

The present invention relates to systems for protecting against sun's damaging rays, and against unwanted onlookers like drones. The systems comprise a drone and a covering member attached to the drone. In one aspect, a Flight Control System, FCS, flies the drone in a selected spot. In one embodiment, the covering member acts like an overhead covering, and a measuring device provides the FCS information for flying the drone on a holding position over a stationary user. In another embodiment, a measuring device enables the FCS to fly the drone over a non-stationary user and to tracking him. Further, the FCS adjusts the drone position with respect to the position of either the sun or a detected drone in the sky. In another embodiment, a radio control, transmitter receiver, pair is used to communicate user's requests to the FCS. One request may be to turn on the motors.

20 Claims, 6 Drawing Sheets

(56) References Cited

U.S. PATENT DOCUMENTS

2016/0363938 A1* 12/2016 Frolov .................. G05D 1/104
2016/0368600 A1* 12/2016 Frolov ................ G08G 5/0021
2017/0160751 A1   6/2017 Pierce
2017/0248970 A1   8/2017 Karabed
2018/0257775 A1*  9/2018 Baek ...................... B64C 27/20

OTHER PUBLICATIONS

Charmaine Caparas, "The Newest Evolution of Drones: The Umbrella Drone," futurism.com, Sci-Fi Visions, Jul. 15, 2016, pp. 1-3.

* cited by examiner

SHADOW CASTING DRONE

CROSS-REFERENCE TO RELATED APPLICATIONS

This application claims the benefit of priority to U.S. provisional patent application No. 62/299,059, filed Feb. 24, 2016, the contents of which are herein incorporated by reference.

BACKGROUND OF THE INVENTION

1) Field of the Invention

The present invention relates generally to drones, relates particularly to shadow casting drones, and more particularly to drones providing protection against the sun's harmful radiations; even more particularly it relates to drones providing protection against unwanted onlookers whether neighbors, strangers or other drones.

2) Description of Prior Art and Related Information

Our invention addresses two distinct problems.

Problem 1:

According to NASA, the sun's harmful UV rays have increased over the last 30 years. The American academy of dermatology reports melanoma rates in the United States doubled from 1982 to 2011. Among means to protect ourselves against the sun's UV rays are: sunscreens, hats and clothing made with protective fabrics, and (sun) umbrellas.

According to a study by Emory university school of medicine, on sunny days, umbrellas can protect our skin from harmful UV rays. The umbrellas used in the study blocked at least 77% of damaging rays. The black umbrellas intercepted 90% of the sun's rays. This makes umbrellas almost as effective as sunscreen. For their protective properties, umbrellas are widely used for shade in parts of Asia as well as the Middle East.

Nevertheless, carrying a sun umbrella can be cumbersome, especially the larger ones used at beaches and parks. No solution has been offered to significantly alleviate the problem of carrying sun umbrellas for protection against the sun's damaging rays.

Problem 2:

Do you believe your privacy is compromised by drones flying over your backyard, gaining unwarranted/unauthorized access by means of state of the art cameras? Is it too much for your family members to desire use of the backyard without having strangers viewing them from above with a drone?

It is believed by the inventor that the prior art provides no practical methods that protect against such loss of privacy.

SUMMARY OF THE INVENTION

In view of the foregoing, the present invention is directed to a method for protecting against the sun's damaging rays, or just providing a refreshing shade. Also the present invention is directed to an apparatus for protecting against unwanted onlookers whether neighbors, strangers or other drones.

In accordance with one aspect of the invention, a drone having a covering member is utilized to protect against the sun's damaging rays, as well as to protect against undesired onlookers.

In accordance with another aspect of the invention, a Flight Control System, FCS, is used to fly a drone having a covering member in a selected spot.

In accordance with another aspect of the invention, a tracking system is used by a drone having a covering member to provide a continuous covering to a moving user.

In accordance with one embodiment of the invention a drone with four rotors is used. The drone has a covering member that acts as an overhead covering. The covering member also acts as a shield against unwanted onlookers like other drones.

In accordance with another aspect of the invention, a drone having a covering member is used where the motors of the drone are situated so that the covering member does not directly block the airflow generated by the motors of the drone. This condition prevents loss of motor energy due to the covering member directly blocking part of the airflow.

In accordance with yet another aspect of the invention, a drone having a covering member is used where the covering member has holes and where the motors of the drone are situated so that the airflow generated by the motors flow through the holes.

In accordance with one embodiment of the invention a drone with four rotors is used.

The drone has a FCS configured to operate the motors of the drone so that a covering member attached to the drone behaves as an overhead covering. In addition, a measuring device is configured to provide the FCS information for flying the drone on a holding position over a stationary user. The measuring device comprises of at least one of the following sensors: image, sound, infrared (IR), ultrasonic, pressure/force, Global Positioning System (GPS), barometer, gyro, compass, or accelerometer. In this disclosure, the term "quadcopter" refers to a drone with four rotors.

The FCS is further configured to make an adjustment in the drone position with respect to either the position of the sun or the position of a detected drone in the sky. More specifically, if the sun is not exactly overhead, then the FCS moves the drone somewhat horizontally away from its general position above the stationary user to better protect the user. And if a drone is detected overheard, then the FCS may move the quadcopter somewhat horizontally away from its general position above the stationary user to a position where the covering member can better protect the user against any possible spying cameras on the detected drone.

In accordance with one embodiment of the invention a drone with four rotors is used. The drone has a FCS configured to operate the motors of the drone so that a covering member attached to the drone behaves as an overhead covering. In addition, a measuring device is configured to provide the FCS information for flying the drone over a non-stationary user and for tracking him. The measuring device comprises of at least one of the following sensors: image, sound, IR, ultrasonic, pressure/force, GPS, barometer, gyro, compass, or accelerometer.

The FCS is further configured to make an adjustment in the drone position with respect to the position of a detected drone in the sky. More specifically, if a drone is detected overheard, then the FCS may move the quadcopter somewhat horizontally away from its general position above the non-stationary user to a position where the covering member can better protect the user against any possible spying cameras on the detected drone.

In accordance with another embodiment of the invention, a Radio Control (RC) Transmitter/Receiver, (TX/RX) pair is used associated with the drone having a FCS. The RX is configured to communicate user requests to the FCS. One request may be to turn on the motors; other requests may be related to flying the drone from an initial position to the where the user is.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF EXEMPLARY EMBODIMENTS OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and sub-goals (e.g., compliance with system, technical, and practical constraints), which will vary from one implementation to another. Moreover, attention will necessarily be paid to proper design and engineering practices for the environment in question. It will be appreciated that such development efforts could be complex and time-consuming, outside the knowledge base of typical laymen, but would nevertheless be a routine undertaking for those of ordinary skill in the relevant fields.

First Embodiment

Figure 1:
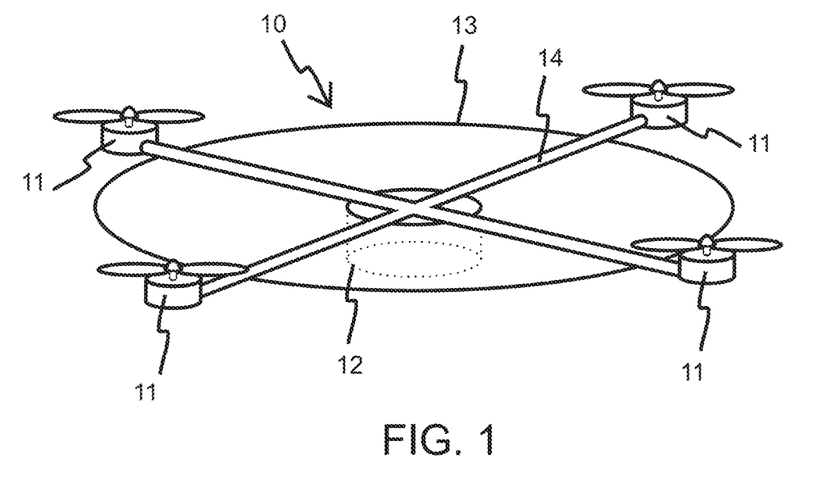
FIG. 1 depicts version 1 of the first embodiment of a shadow casting drone.
Figure 2:
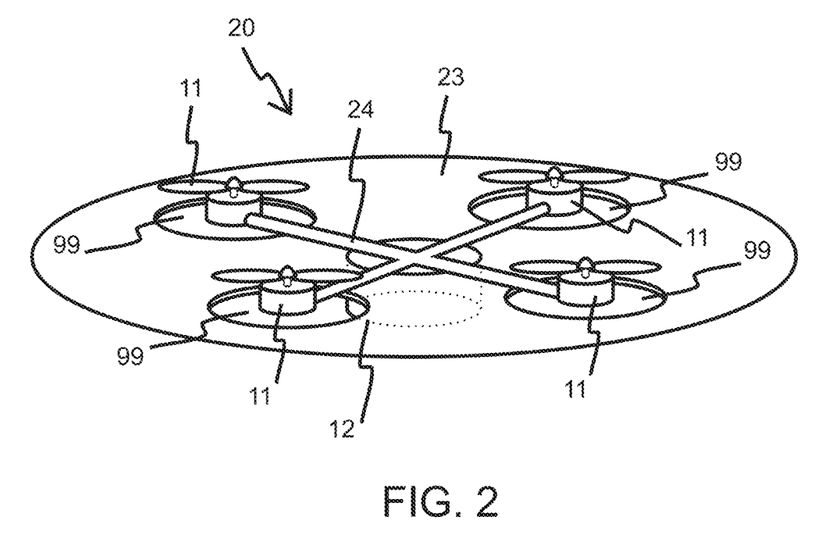
FIG. 2 depicts version 2 of the first embodiment of a shadow casting drone.

Referring to FIGS. 1 and 2, versions 1 and 2 of a first embodiment of the shadow casting drone are shown respectively. FIG. 1 illustrates a quadcopter 10 having four motors 11. The motors 11 are affixed to a frame 14. The drone 10 has a flight control system, FCS, 12 and a covering member 13. The four motors 11 are extended outside the covering member 13. Therefore, the covering member 13 does not directly block airflow generated by the motors 11 of the drone 10, preventing loss of motor energy.

Figure 3:
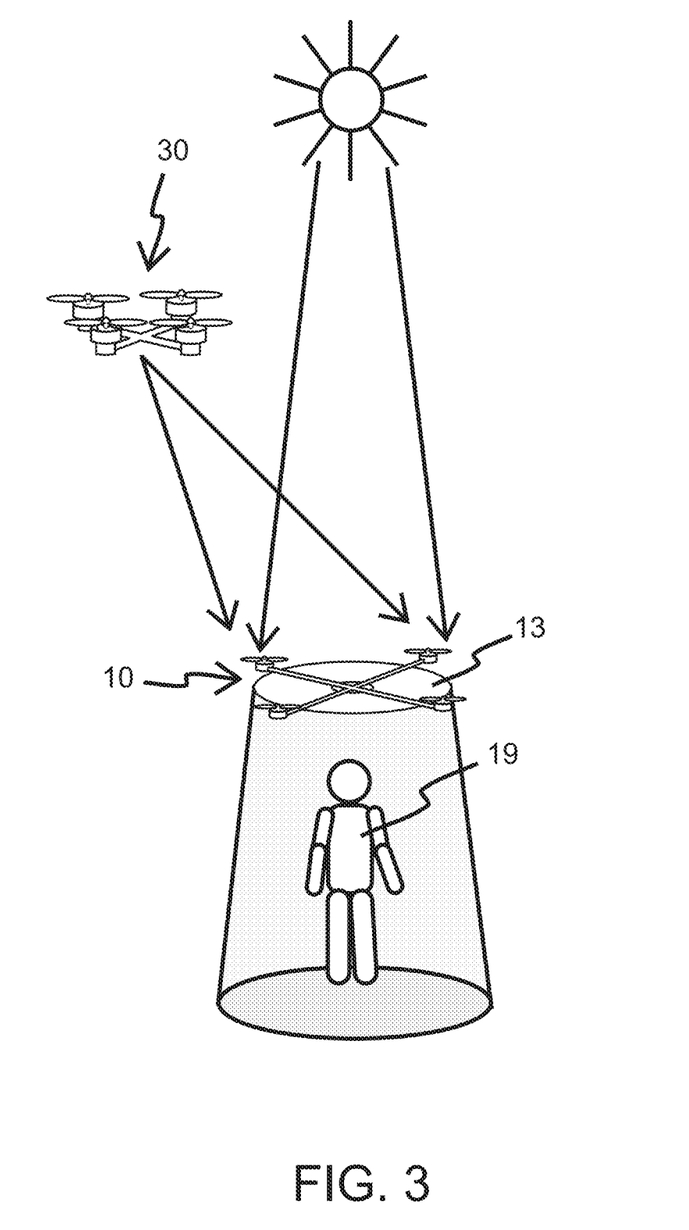
FIG. 3 illustrates the protective properties of the first embodiment pictorially.

The FCS 12 is configured to fly the drone to a height above a user's head. Referring to FIG. 3, the covering member 13 of the drone 10 blocks the sun's harmful rays from reaching a user 19, and it shields the user 19 against an onlooking drone 30.

In this disclosure, the term 'user' refers to both a person and thing that benefit from the invention. Therefore it may refer to a person, a selected object and a selected spot.

In more detail, the FCS 12 of the shadow casting drones 10 of the first embodiment first flies the drone 10 to a selected height, next it keeps the drone 10 hovering in a stationary manner. In this position, the covering member 13 of the drone 10 protects anyone standing or sitting under its shadow from the sun's UV lights and from the cameras of other drones.

FIG. 2 shows version 2 of the first embodiment of the shadow casting drone. A shadow casting drone 20 has a frame 24 and has four motors 11 that are positioned inside four holes 99 in a covering member 23. Therefore, again the covering member 13 does not directly block airflow generated by the motors 11 of the drone 10, preventing loss of motor energy.

The FCS 12 of the shadow casting drones 20 of version 2 of the first embodiment first fly the drone 20 to a selected height, then it keeps the drones 20 hovering in a stationary manner. In this position, the covering member 23 of the drone 20 protects anyone standing or sitting under its shadow from the sun's UV lights and from the cameras of other drones.

Second Embodiment

Figure 4:
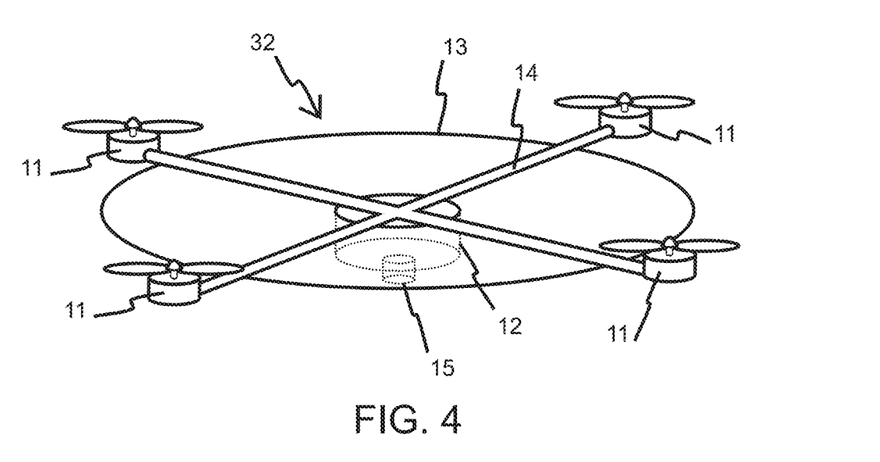
FIG. 4 depicts the second and third embodiments of a shadow casting drone.

Referring to FIG. 4, a second embodiment of the shadow casting drone is shown. The second embodiment gives a shadow casting drone that protects a stationary user from an unwanted onlooking drone. FIG. 4 shows a quadcopter 32 having four motors 11. The motors 11 are affixed to a frame 14. The drone 32 has a flight control system, FCS, 12 and a covering member 13. The four motors 11 are placed outside the covering member 13.

The FCS 12 of the shadow casting drones 32 of the second embodiment first flies the drone 32 to a selected height, and then it keeps the drone 32 hovering in a stationary manner. In this position, the covering member 13 of the drone 32 acts as an overhead covering, protecting anyone standing or sitting under its shadow from the cameras of other drones.

Referring to FIG. 4, the second embodiment further comprises a measuring device 15. The measuring device 15 is configured to provide the FCS 12 information for flying the drone 32 on a stable holding position over a stationary user. The measuring device 15 comprises of at least one of the following sensors: image, IR, ultrasonic, pressure/force, GPS, barometer, gyro, compass, or accelerometer.

Without the measuring device 15, the FCS 12 cannot prevent the drone 32 from drifting from an initial position due to wind or other disturbance.

The FCS 12 may use any of the following methods in order to fly the drone 32 on a stable holding position over the stationary user.

Briefly, with image processing an image sensor data, the FCS 12 may find the direction from the drone 32 toward the stationary user. Then the FCS 12 may make adjustments in the drone 32 position to keep it stable against wind and other disturbances.

With processing an IR sensor data or an ultrasonic sensor data, the FCS 12 may evaluate the distance to the stationary user and make adjustments in the drone 32 position to keep it stable.

With processing a GPS, a gyro, a compass, a barometer, or an accelerometer data, the FCS 12 may evaluate small changes in the drone 32 position and make adjustments in the drone 32 position to keep it stable.

Regarding a pressure/force sensor of a joystick variety, when one end of a string is tied to the sensor and the other end is held by the stationary user, then relative position changes between the drone 32 and the stationary user may be detected by the FCS 12 and may be used to stabilize the drone 32 position with respect to the user.

Figure 5:
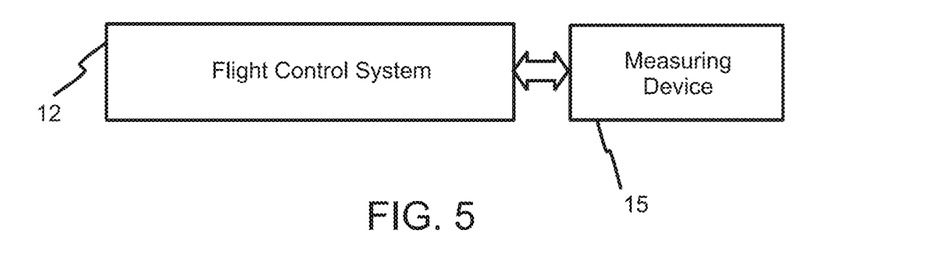
FIG. 5 depicts a block diagram illustrating the measuring device of the second and third embodiment of a shadow casting drone.

FIG. 5 depicts a block diagram explaining the interaction between the FCS 12 and the measuring device 15. Measurements by the measuring device 15 are available to the FCS 12.

Figure 7:
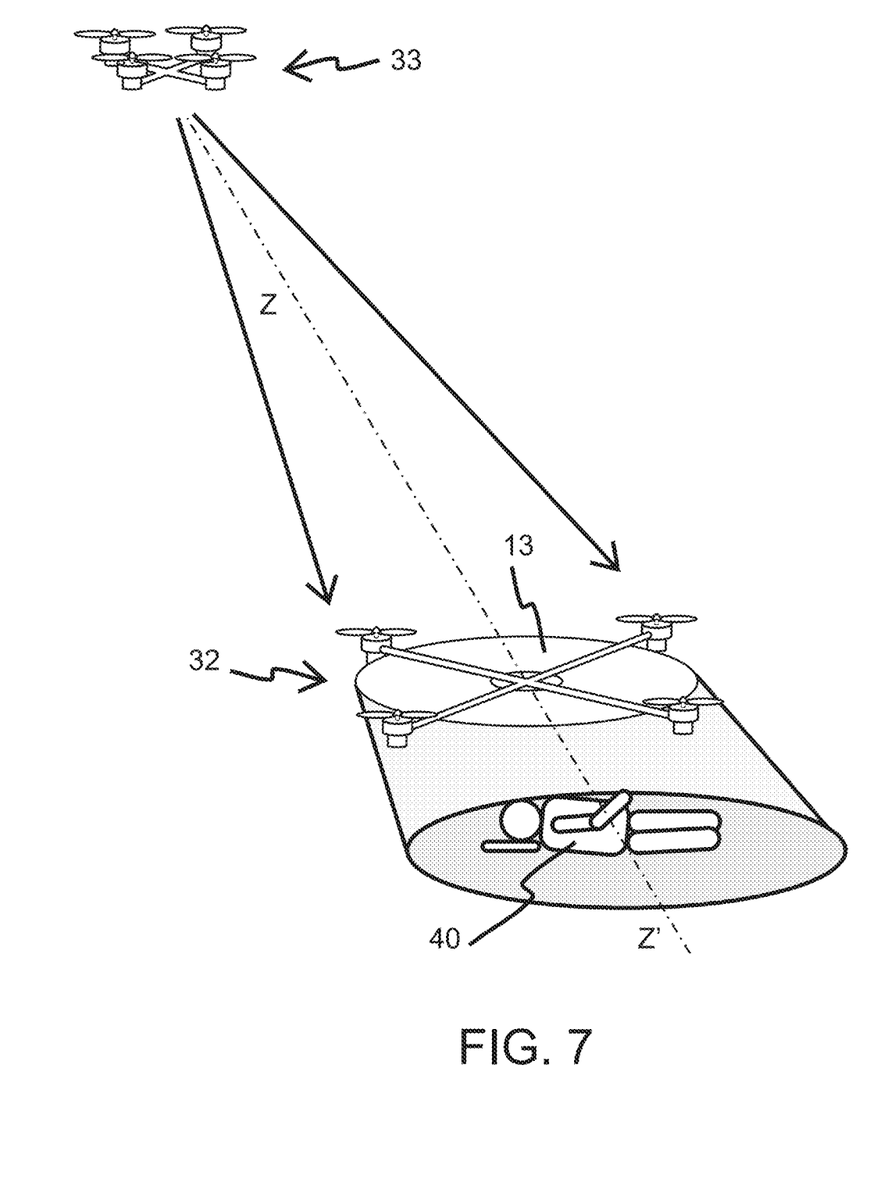
FIG. 7 illustrates the positional adjustment made in response to the position of the unwanted drone in the second embodiment pictorially.

FIG. 7 shows the shadow casting drone 32, a user 40 resting on his/her back, and an unwanted drone 33. In the second embodiment, the FCS 12 of the drone 32 is further configured to make adjustments in the drone position with respect to the position of a detected drone in the sky. Specifically, when the drone 33 is detected overheard, the FCS 12 may move the drone 32 somewhat horizontally away from its general position above the user 40 to better protect the user 40 against any possible spying cameras on the detected drone 33. More specifically referring back to FIG. 7, based on measurements of the measuring device 15, the FCS 12 first approximates the directions of the unwanted drone 33 and the user 40; next it moves the drone 32 somewhat horizontally to generally align the user 40, the drone 32 and the unwanted drone 33. The ZZ' axis shows this alignment. The alignment of the unwanted drone 33, the drone 32 and the user 40 places the drone 32 between the second drone 33 and the user 40 so that the covering member 13 provides a covering for the user 40 against any possible spying cameras on the second drone 33.

Additionally, if the drone 33 lowers its elevation in order to move between the drone 32 and the user 40, then the FCS would also lower the elevation of the drone 32 to keep the drone 32 between the user 40 and the drone 33. The FCS will not lower the drone 32 where the drone 32 becomes dangerous to the user 40.

The FCS 12 may use a sound detector to detect the presence of an unwanted drone and to find the direction from the drone 32 toward the unwanted drone.

Third Embodiment

Next a third embodiment of the shadow casting drone is explained. This embodiment generalizes the second embodiment in that the second embodiment illustrates the invention for a stationary user, and the third embodiment illustrates the invention for a non-stationary user. The third embodiment has many similarities to the second embodiment. The two embodiments mostly differ in the way they process their measuring devices. To describe the third embodiment, we will use FIGS. 4 and 5 of the second embodiment.

FIG. 4 shows a quadcopter 32 having four motors 11. The motors 11 are affixed to a frame 14. The drone 32 has a flight control system, FCS, 12 and a covering member 13. The four motors 11 are placed outside the covering member 13.

Referring to FIG. 4, the third embodiment further comprises a measuring device 15. The measuring device 15 is configured to provide the FCS 12 information for tracking a non-stationary user with the drone 32 and for covering the non-stationary user with the covering member 13. The measuring device 15 comprises of at least one of the following sensors: image, IR, ultrasonic, pressure/force, GPS, barometer, gyro, compass, or accelerometer.

The FCS 12 of the shadow casting drones 32 of the third embodiment first flies the drone 32 to a selected height and then it has the drone 32 tracking the non-stationary user so that the covering member 13 acts as an overhead covering, protecting the non-stationary user from the sun's UV lights.

In order to track the non-stationary user, the FCS 12 may use any of the earlier given methods that utilize sensors belonging to the measuring device 15.

FIG. 5 depicts a block diagram explaining the interaction between the FCS 12 and the measuring device 15. Measurements by the measuring device 15 are made available to the FCS 12 of the third embodiment.

Figure 6:
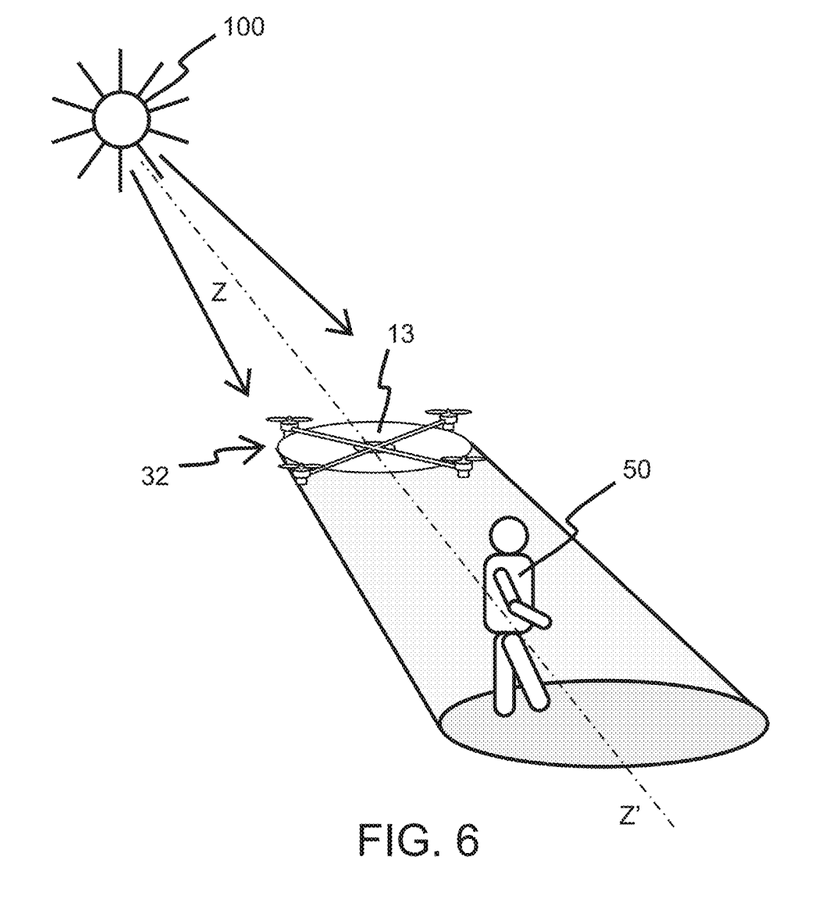
FIG. 6 illustrates the positional adjustment made in response to the position of the sun in the third embodiment pictorially.

FIG. 6 shows the shadow casting drone 32, a user 50 walking, and a sun 100. In the third embodiment, the FCS 12 of the drone 32 is further configured to make adjustments in the drone 32 position with respect to the position of the sun 100 in the sky. Specifically, when the sun 100 is not exactly overhead, then the FCS 12 moves the drone 32 somewhat horizontally away from its general position above the user 50 to better protect the user 50. More specifically referring to FIG. 6, based on the measurements of the measuring device 15, the FCS 12 first approximates the directions toward the sun 100 and toward the user 50; next it moves the drone 32 somewhat horizontally to generally align the user 50, the drone 32 and the sun 100. The ZZ' axis shows this alignment. The alignment of the sun 100, the drone 32 and the user 50 offsets the movements of the shadow due to movements of the sun 100.

The FCS 12 may find the direction from the drone 32 toward the sun 100 by image processing an image sensor data.

Fourth Embodiment

Figure 8:
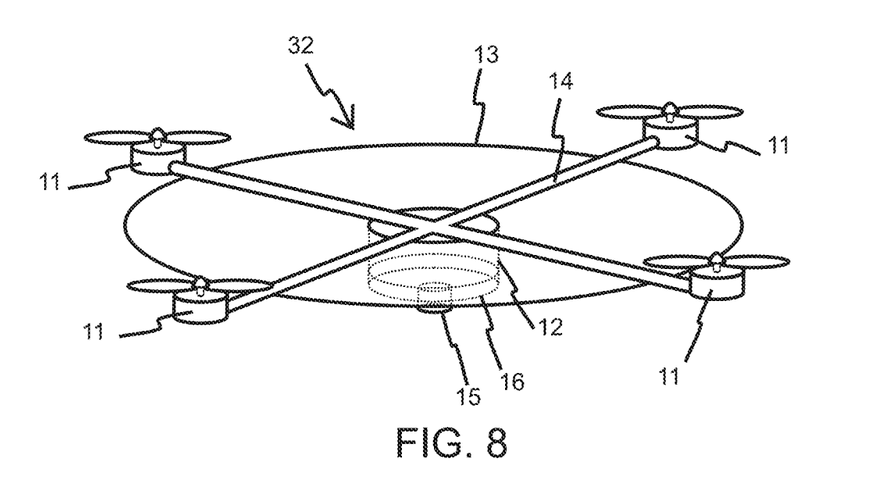
FIG. 8 depicts the fourth embodiment of a shadow casting drone.

A fourth embodiment is presented next. The fourth embodiment is the third embodiment equipped with a RC transmitter/receiver, (TX/RX) pair. FIG. 8 shows the shadow casting drone 32 of the third embodiment equipped with a RC receiver (RX) 16.

Figure 9:
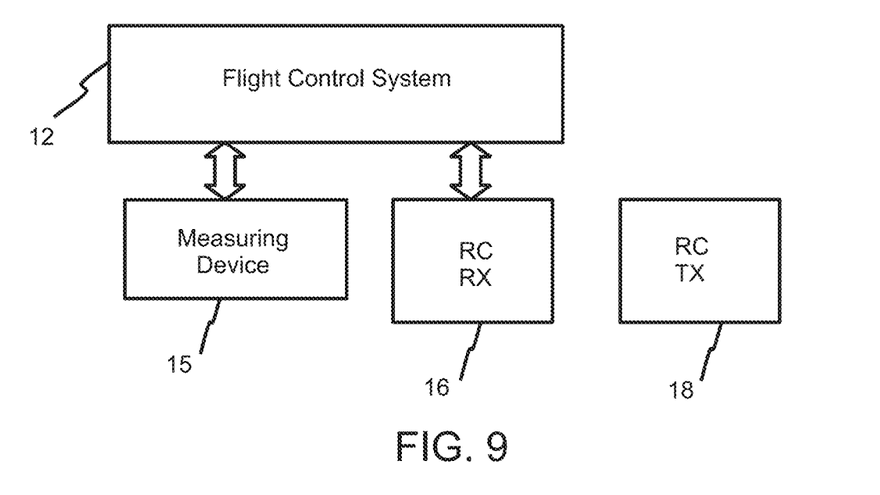
FIG. 9 depicts a block diagram illustrating the RC transmitter/receiver pair of the fourth embodiment of a shadow casting drone.

Referring to the block diagram of FIG. 9, a user may send requests to the receiver (RX) 16 with a transmitter (TX) 18. In turn, the receiver (RX) 16 sends the user requests to the FCS 12 of the drone 32. One request may be to turn on the motors 11; other requests may be related to flying the drone 32 from an initial position to where the user is.

Although we have used quadcopters in the embodiments, the invention is not limited to drones with 4 motors. The quadcopter is used as an example only.

It is desired that the covering member be of a light weight material. An ultralight fabric would work if the motor frame is rigid enough. Also use of materials with UV protection would enhance the protection capability of the drone against sun's rays.

Even transparent fabrics with UV protection may be used for the covering member if only protection against the sun's rays is needed.

The shadow casting drone may be constructed such that it could be folded for storage. One way is to make the covering member of a soft fabric and make the frame collapsible.

Although much emphasis has been placed on the protective aspect of the shadow generated by the covering member, nevertheless the invention directly applies to situations where a shadow is desired to bring a moment of refreshment.

As mentioned earlier, in general, the shadow casting drone may provide shade to an object or to a selected spot on the ground as well as to a person. The object or the spot need to be either directly detectable by the measuring device 15, or indirectly detectable through markings we may add, or they could be defined by their GPS coordinates.

What is claimed is:

1. A first drone, comprising:
a frame;
a covering member attached to the frame;
a flight control system on board the first drone, the flight control system configured to:
 detect a presence of a second drone above an object on the ground; and
 fly the first drone to a position between the second drone and the object to block, by the covering member, a view of the object from the second drone.

2. The first drone of claim 1 further comprising:
a measuring device configured to provide the flight control system information for flying the drone on a stabilized holding position between the second drone and the object.

3. The first drone of claim 2, where the measuring device comprises at least one of an IR sensor and an ultrasonic sensor.

4. The first drone of claim 3, wherein the flight control system is further configured to make an adjustment in the drone position with respect to the position of the sun based on measurements from the measuring device such that the sun, the drone and the object are substantially aligned, wherein the flight control system offsets a movement of a shadow cast on the object by the covering member due to a movement of the sun by the adjustment in the drone position.

5. The first drone of claim 1, wherein when the flight control system flies the drone between the second drone and the object, the covering member provides a covering for the object against one or more cameras on the second drone.

6. The first drone of claim 3,
wherein the object is non-stationary;
wherein the measuring device is configured to provide the data measured by the sensor regarding the non-stationary object to the flight control system;
wherein the flight control system is further configured to:
 determine a distance between the first drone and the non-stationary object;
 make an adjustment in the first drone position with respect to the position of the second drone and the position of the non-stationary object based on the distance between the drone and the non-stationary object such that the covering member provides a covering for the non-stationary object against one or more cameras on the second drone.

7. A shadow casting drone comprising:
a frame;
a set of one or more motors attached to the frame;
a covering member attached to the frame for casting shadow, the covering member having a hole, wherein a first motor in the set of motors of the drone is situated such that airflow generated by the first motor flows through the hole, wherein the covering member exceeds a perimeter of the frame;
a flight control system on board the shadow casting drone; and
a measuring device;
wherein the measuring device is configured to:
 provide the flight control system data for tracking a non-stationary person; and
 provide the flight control system information for a position of the sun;
wherein the flight control system is configured to:
 determine a position of the non-stationary person based on the tracking data; and
 fly the drone based on the position of the non-stationary person and the position of the sun such that the sun, the drone, and the non-stationary person are aligned and the covering member casts a shadow over the non-stationary person.

8. The shadow casting drone of claim 7, wherein the covering member comprises fabric.

9. The shadow casting drone of claim 8, wherein the fabric is soft, and wherein the frame and the attached fabric are collapsible.

10. The shadow casting drone of claim 7,
wherein the measuring device comprises one of an IR sensor and an ultrasonic sensor for measuring tracking data;
wherein the measuring device is configured to provide the tracking data to the flight control system;
wherein the flight control system is configured to:
 determine a distance between the drone and the non-stationary person based to the tracking data; and
 determine the position of the non-stationary person based on the distance between the drone and the non-stationary person.

11. A drone, comprising:
a frame;
a covering member attached to the frame;
a flight control system on board the drone; and
a measuring device comprising a sensor for collecting tracking data for tracking a non-stationary person, wherein the measuring device is configured to provide the tracking data to the flight control system;
wherein the flight control system is configured to:
 determine a distance between the drone and the non-stationary person based on the tracking data; and
 hover the drone at a substantially same distance over the non-stationary person to provide covering, by the covering member, for the non-stationary person.

12. The drone of claim 11, wherein the measuring device comprises one of an IR sensor and an ultrasonic sensor;
wherein the flight control system is configured to:
 receive measurements from the sensor;
 determine the distance between the drone and the person based on the measurements received from the sensor; and
 stabilize a position of the drone with respect to the person based on the determined distance.

13. The drone of claim 11, wherein the measuring device comprises one of a pressure sensor and a force sensor configured to be tied to a string held to the person; and
wherein the flight control system is configured to:
 receive measurements from the sensor;
 determine relative position changes between the drone and the person based on the sensor measurements; and
 stabilize a position of the drone position with respect to the person based on the relative position changes between the drone and the person.

14. The drone of claim 11, wherein the measuring device comprises one of a GPS sensor, a barometer sensor, a gyro sensor, a compass sensor, and an accelerometer sensor;
wherein the flight control system is configured to:

receive measurements from the sensor;
process the sensor measurements to determine changes in a position of the drone; and
stabilize the position of the drone with respect to the person based on the determined changes in the position of the drone.

15. The drone of claim 11, wherein the covering member casts a shadow over the non-transitory person by hovering over the non-transitory person.

16. The drone of claim 11, wherein the covering member blocks a view of the non-transitory person from another drone by hovering over the non-transitory person.

17. The drone of claim 11, wherein the covering member comprises fabric.

18. The drone of claim 17, wherein the fabric is soft, and wherein the frame and the attached fabric are collapsible.

19. The first drone of claim 1, wherein the flight control system is configured to lower an elevation of the first drone when the second drone lowers the second drone's elevation.

20. The first drone of claim 19, wherein the flight control system is configured to lower the first drone only to an elevation that is not dangerous to the object.

* * * * *